(12) United States Patent
Padia et al.

(10) Patent No.: US 8,788,702 B2
(45) Date of Patent: *Jul. 22, 2014

(54) STORAGE AREA NETWORK MULTI-PATHING

(71) Applicant: International Business Machines Corporation, Armonk, NY (US)

(72) Inventors: Praveen K. Padia, Pune (IN); William J. Scales, Hampshire (GB); Rohit Shekhar, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/801,537

(22) Filed: Mar. 13, 2013

(65) Prior Publication Data

US 2013/0219079 A1    Aug. 22, 2013

Related U.S. Application Data

(63) Continuation of application No. 13/464,618, filed on May 4, 2012.

(30) Foreign Application Priority Data

May 6, 2011 (EP) .................................... 11165029

(51) Int. Cl.
*G06F 15/16* (2006.01)
*H04L 29/08* (2006.01)

(52) U.S. Cl.
CPC ........ *H04L 67/1097* (2013.01); *H04L 67/1014* (2013.01); *H04L 67/101* (2013.01)
USPC .............................. 709/238; 709/224; 710/37

(58) Field of Classification Search
CPC ...................................................... H04L 67/101
USPC ........ 709/200–202, 224, 238, 239; 710/1, 36, 710/37, 74
See application file for complete search history.

(56) References Cited

U.S. PATENT DOCUMENTS 7,275,103 B1   9/2007  Thrasher et al.
7,631,023 B1   12/2009 Kaiser et al.
(Continued)

FOREIGN PATENT DOCUMENTS

WO    2011061742    5/2011

OTHER PUBLICATIONS

German Office Action dated Aug. 6, 2012 for Application No. 10 2012 206 283.1.

(Continued)

*Primary Examiner* — Moustafa M Meky
(74) *Attorney, Agent, or Firm* — David W. Victor; Konrad Raynes Davda & Victor LLP (57) ABSTRACT

Provided are a method, computer program product and system for network multi-pathing. Paths to a storage system are through a first network type and a second network type. The first network type has a higher Input/Output (I/O) per second performance characteristic than the second network type. A length is determined from a received I/O request. The I/O request is sent on one of the paths to the storage system through the first network type in response to determining that the length of the I/O request is below a threshold length. The I/O request is sent on one of the paths to the storage system through the second network type in response to determining that the length of the I/O request is above the threshold length.

8 Claims, 4 Drawing Sheets

(56) References Cited

U.S. PATENT DOCUMENTS

| | | |
|---|---|---|
| 7,640,390 B2 * | 12/2009 | Iwamura et al. .............. 711/103 |
| 7,688,753 B1 | 3/2010 | Zimran et al. |
| 2002/0083120 A1 | 6/2002 | Soltis |
| 2003/0177290 A1 | 9/2003 | Ayukawa et al. |
| 2009/0031057 A1 | 1/2009 | Ghosalkar et al. |
| 2009/0228669 A1 | 9/2009 | Slesarev et al. |
| 2010/0153612 A1 | 6/2010 | Zwisler et al. |
| 2010/0191876 A1 | 7/2010 | Muppirala et al. |
| 2010/0217933 A1 | 8/2010 | Oe et al. |
| 2011/0078512 A1 | 3/2011 | Grube et al. |
| 2012/0284424 A1 | 11/2012 | Padia et al. |

OTHER PUBLICATIONS

GB Search and Examination Report dated Aug. 31, 2012 for Application No. GB1207614.7.

G. Orenstein, et al., "Integration Scenarios for iSCSI and Fibre Channel", SNIA IP Storage Forum, pp. 1-7 (2002).

HP Smart Array Multipath Software User Guide, Hewlett Packard, Part No. 354907-004, Dec. 2005, pp. 1-31.

O. Tickoo, et al., "Smart Multipath Capacity Aggregation for High Quality Video Streaming", pp. 1-8 (2007).

Preliminary Amendment filed Mar. 13, 2013, pp. 6, for U.S. Appl. No. 13/464,618, filed May 4, 2012 by inventors P.K. Padia, et al., (18.445).

Response dated Dec. 12, 2012 to GB Search and Examination Report dated Aug. 31, 2012 for Application No. GB1207614.7.

Office Action dated Sep. 9, 2013, pp. 19, for U.S. Appl. No. 13/464,618, filed May 4, 2012, GB920100107US1 (18.445).

Response dated Dec. 9, 2013, pp. 6, to Office Action dated Sep. 9, 2013, pp. 19, for for U.S. Appl. No. 13/464,618, filed May 4, 2012, GB920100107US1 (18.445).

Notice Allowance dated Dec. 26, 2013, pp. 12, for for U.S. Appl. No. 13/464,618, filed May 4, 2012, GB920100107US1 (18.445).

* cited by examiner

STORAGE AREA NETWORK MULTI-PATHING

CROSS-REFERENCE TO RELATED FOREIGN APPLICATION

This application is continuation of U.S. patent application Ser. No. 13/464,618, filed May 4, 2012, which is a non-provisional application that claims priority benefits under Title 35, United States Code, Section 119(a)-(d) from European Patent Application entitled "STORAGE AREA NETWORK MULTI-PATHING", by William J. SCALES, Praveen K. PADIA, and Rohit SHEKHAR, having European Patent No. 11165029.7, filed on May 6, 2011, which U.S. and European Patent Applications are incorporated herein by reference in its entirety.

FIELD OF THE INVENTION

This invention relates to the field of network multi-pathing. In particular, the invention relates to network multi-pathing with paths of different performance characteristics.

BACKGROUND OF THE INVENTION

The majority of medium and large data centres use a Fibre Channel (FC) based storage area network (SAN) to attach host servers to storage controllers. One of the common trends seen in most of the data centres is that with an increase in work load, the demand to increase SAN bandwidth also rises. For example data centres that have deployed a 2 Gb/s or 4 Gb/s FC SAN infrastructure a few years ago are likely to now need additional bandwidth and will be looking to upgrade their SAN.

There are a variety of ways in which a SAN can be upgraded.

1. Add more ports between host servers and the SAN and between the storage controller and the SAN and use multi-pathing technology to spread the I/O workload across the alternative paths (load balancing).

2. Replace the existing FC SAN with the latest (8 Gb/s FC) technology to increase the performance of the SAN without increasing the number of ports.

3. Replace the existing FC SAN with a 1 Gb/s or 10 Gb/s Ethernet SAN and use either FC over Ethernet (FCoE) or the iSCSI protocol.

4. Keep the existing FC SAN and use option 2 or 3 to create an additional SAN. Use multi-pathing technology to spread the I/O workload across the existing SAN and the new SAN.

FC is currently the predominate technology used for constructing SANs. It is a mature technology that offers very good performance (in terms of bandwidth, in terms of I/O operations per second (IOPs), and in terms of latency) with relatively low overheads in both the storage controller and the host server. The main drawback of FC is that it is expensive.

Internet Small Computer System Interface (iSCSI) is emerging as one of the acceptable SAN technologies in modern day data centres. Most of the storage controllers and host servers now support iSCSI. Using 1 Gb/s Ethernet to create an iSCSI SAN is a very cheap way of connecting host servers to storage controllers. However, iSCSI is much more CPU intensive (even with iSCSI offload hardware) than FC which means that IOPs performance will usually be lower than the equivalent that can be obtained using a FC SAN. Where iSCSI performs well is with high bandwidth workloads where a small number of larger I/O requests is able to saturate the iSCSI link bandwidth without significant CPU overheads.

Using 10 Gb/s Ethernet to create a 10 Gb/s iSCSI SAN is also possible, however the cost of 10 Gb/s Ethernet hardware is more comparable to that of a FC SAN, although it may be possible to share the hardware in the host servers for other networking.

Fibre Channel over Ethernet (FCoE) is a relatively new technology that allows FC frames to be transported over a 10 Gb/s Ethernet network. It offers the same performance characteristics as FC. The main drawback of FCoE is that it is expensive, it currently requires specialist Ethernet switches and the technology is still maturing.

There are many multi-pathing solutions available and most modern operating systems now include multi-pathing drivers as part of the base operating system. Many of the multi-pathing drivers support both FC and iSCSI based I/O to the same storage Logical Units (LU)s. The simplest multi-pathing drivers just implement redundancy by issuing all I/O requests across one path and only switching to use an alternative path when I/O requests fail. More sophisticated multi-pathing drivers implement load-balancing schemes to attempt to spread I/O requests across the multi-paths and hence achieve better performance.

The load balancing algorithms are typically very simple, for example:

1. Preferred path. All I/O requests to a given LU will be routed via the same path, different LUs will be assigned different paths so that so long as I/O requests are submitted to multiple LUs in parallel the workload will be spread across the available paths.

2. Round-robin I/O requests across all available paths. So if there are two paths across a SAN to a particular storage LU the multi-pathing driver will submit the first I/O request via one path, the second I/O request via the second path, the third I/O via the first path, etc.

3. Queue depth based path selection. The path with the least number of active I/O requests will be chosen when starting a new I/O request. Hence if there are two paths and one path has 5 active I/O requests while the other has 3 active I/O requests then the second path will be chosen when starting a new I/O request.

Using a multi-pathing driver with paths across SANs with different performance characteristics (for example, a mixture of FC and iSCSI paths to the same storage LU) has the problem that current multi-pathing drivers do not differentiate between the performance characteristics of the different paths and therefore performance is likely to be reduced to that of the slowest path.

Therefore, there is a need in the art to address the aforementioned problem.

SUMMARY

Provided are a method, computer program product and system for network multi-pathing. Paths to a storage system are through a first network type and a second network type. The first network type has a higher Input/Output (I/O) per second performance characteristic than the second network type. A length is determined from a received I/O request. The I/O request is sent on one of the paths to the storage system through the first network type in response to determining that the length of the I/O request is below a threshold length. The I/O request is sent on one of the paths to the storage system through the second network type in response to determining that the length of the I/O request is above the threshold length.

BRIEF DESCRIPTION OF THE DRAWINGS

A preferred embodiment of the present invention will now be described, by way of example only, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Described embodiments provide a method for storage area network (SAN) multi-pathing, comprising: having options of sending an I/O request to a first SAN type and sending an I/O request to a second SAN type, wherein the first SAN type has a higher I/O per second performance characteristic than the second SAN type; receiving an I/O request; and determining the length of the I/O request: if the length is below a threshold length, sending the I/O request to the first SAN type; if the length is above a threshold length, sending the I/O request to the second SAN type.

The embodiments for multipathing may determine if a bandwidth of the second SAN type is full for a time period, and if full, send an I/O request with a length above the threshold length to the first SAN type. In certain embodiments, determining if a bandwidth is full may comprise determining if the total lengths of I/O requests in a given time period are above a threshold bandwidth. The threshold bandwidth and the given time period may be tuned to the available bandwidth of the second SAN type. The types of the first and second SAN types may be detected from a low level transport driver. Further, user configuration of the types of the first and second SAN types may be received. In certain embodiments, the first SAN type may be a Fibre Channel (FC) SAN, and the second SAN type may be an Internet Small Computer System Interface (iSCSI) based SAN. Yet further, the first SAN type may be a Fibre Channel (FC) type SAN having a first bandwidth, and the second SAN type may be a Fibre Channel (FC) type SAN having a second bandwidth which is lower than the first bandwidth.

In further embodiments, there is provided a multi-pathing driver for a storage area network (SAN) system, wherein the driver has options of sending an I/O request to a first SAN type and sending an I/O request to a second SAN type, wherein the first SAN type has a higher I/O per second performance characteristic than the second SAN type. The driver may comprise: a connection to a first SAN type; a connection to a second SAN type; an I/O request receiver; a path type selection component comprising: an I/O length determining component for determining if the length of an I/O request is below or above a threshold length; a path type selector for selecting the first or second SAN type based on the I/O length.

The path type selection component may comprise: a cumulative I/O request component for determining if a bandwidth of the second SAN type is full for a time period, and if full, the path type selector sending an I/O request with a length above the threshold length to the first SAN type. The cumulative I/O request component for determining if a bandwidth is full may comprise: determining if the total lengths of I/O requests in a given time period are above a threshold bandwidth. The path type selection component may comprise: a tuning component for tuning the threshold bandwidth and the given time period to the available bandwidth of the second SAN type. The driver may comprise a path type detection component for detecting the types of the first and second SAN types from a low level transport driver. The driver may comprise a path type setting component for receiving user configuration of the types of the first and second SAN types. The first SAN type may comprise a Fibre Channel (FC) SAN, and the second SAN type may comprise an Internet Small Computer System Interface (iSCSI) based SAN. The first SAN type may comprise a Fibre Channel (FC) type SAN having a first bandwidth, and the second SAN type may comprise a Fibre Channel (FC) type SAN having a second bandwidth which is lower than the first bandwidth.

According to further embodiments, there is provided a storage area network system, comprising: a host server having a multi-pathing driver; a storage controller for providing access to multiple storage devices; a first SAN type connecting the host server to a storage controller; a second SAN type connecting the host server to the storage controller; wherein the multi-pathing driver comprises: an I/O request receiver; a path type selection component comprising: an I/O length determining component for determining if the length of an I/O request is below or above a threshold length; and a path type selector for selecting the first or second SAN type based on the I/O length.

According to yet further embodiments, there is provided a computer program stored on a computer readable medium and loadable into the internal memory of a digital computer, comprising software code portions, when said program is run on a computer, for performing the method of the first aspect of the present invention.

A method and system are described for upgrading an existing SAN bandwidth with an additional SAN path of a different type without compromise to existing IOPs performance.

There are many different SAN types including: Fibre Channel (FC); Fibre Channel over Ethernet (FCoE); SCSI RDMA Protocol (SRP) over Infiniband iSCSI Extensions for RDMA (iSER) over Infiniband; Serial Attached SCSI (SAS) iSCSI.

The described embodiments are applicable to using a combination of iSCSI with one of the other SAN types because of the price and performance characteristics of iSCSI. However, the described embodiments may also be applied to other combinations of SAN types.

In one embodiment, an existing SAN bandwidth provided by a FC SAN is upgraded by adding a low cost iSCSI based SAN to provide additional bandwidth. In another embodiment, an exiting FC SAN is upgraded by adding another FC SAN with a different performance characteristic.

The described embodiments provide enhancements to a multi-pathing driver so that it selects a suitable path across the different types of SAN according to the size of the I/O request in order to maintain SAN performance.

In one embodiment, a iSCSI SAN is selected by the multi-pathing driver for larger (bandwidth intensive) I/O requests while a path across the FC SAN is selected for smaller (IOPs intensive I/O requests) so that the overall performance is as good as that of a larger FC SAN but with a lower cost.

There are two aspects of performance for I/O operations.

(1) IOPs (I/O per second): IOPs is the number of I/O operations which can be completed in a second. This is generally proportional to execution cost of I/O command and this is generally independent of data size. The method of measuring IOPs is by sending small length I/O commands. If large length I/O commands are sent then available bandwidth will become a bottleneck before finding out the CPU bottleneck for processing these commands.

(2) I/O bandwidth: The I/O bandwidth is the amount of data transferred per second. This is generally measured by sending large length I/O requests (64 Kb, 256 Kb, etc.) so that the CPU does not become the bottleneck (per command execution overhead is generally independent of I/O length) and exact bandwidth can be calculated.

Almost all SAN deployments use a multi-pathing device driver in the host server to allow a host to select between different paths to the same storage LU. This has primarily been used to provide redundancy (no single point of failure) but is now also being used to enhance performance by load balancing.

Figure 1:
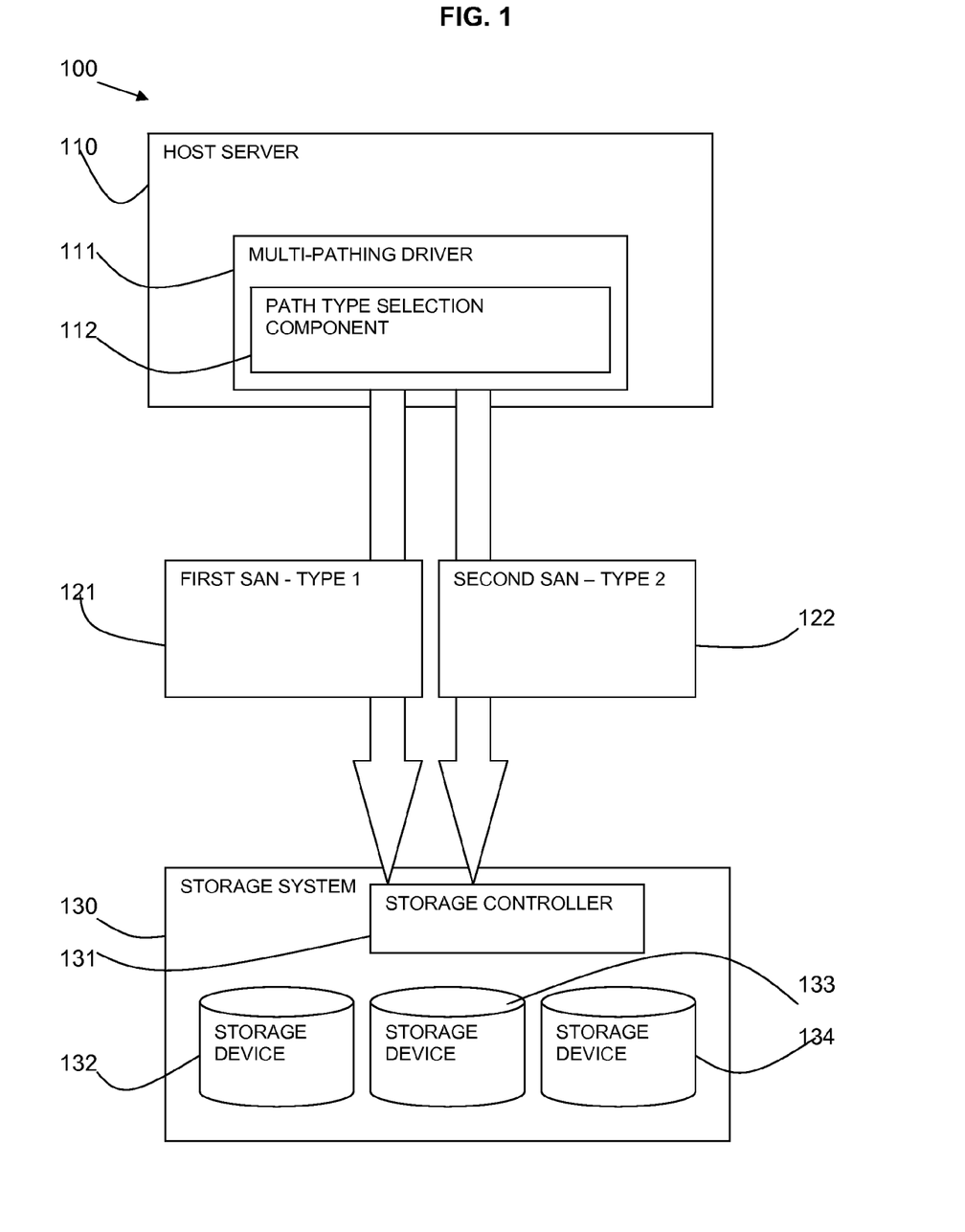
FIG. 1 is a block diagram of a system in accordance with described embodiments.

Referring to FIG. 1, a block diagram shows an embodiment of the described system 100 which shows a configuration of a host application attached to storage via a SAN.

A host server 110 is attached to a storage system 130 comprising at least one storage controller 131 providing access to multiple storage devices 132-134. The host server 110 is attached to a storage controller 131 via two or more SANs 120. A first SAN 121 is of a first type and has first performance characteristics, and a second SAN 122 is of a second type and has second performance characteristics. The first SAN 121 has a higher IOPs performance characteristic than the second SAN 142 making it more suitable for short I/O requests.

In one embodiment, the first SAN 121 may be a FC SAN which has good performance characteristics for smaller IOPs intensive I/O requests. The second SAN 122 may be an iSCSI based SAN which has good performance characteristics for longer I/O requests but has high CPU overheads for shorter I/O requests. The first SAN 121 may be an existing FC SAN to which additional bandwidth is supplied by adding the second SAN 122 in the form of an iSCSI based SAN.

In another embodiment, the first SAN 121 and the second SAN 122 may both be FC SANs, with the first SAN 121 implemented using higher Gb/s technology than the second SAN 122.

The host server 110 comprises a multi-pathing driver 111 comprising a path type selection component 112 for selecting which of the SANs 121, 122 to be used for an I/O request. The path type selection component 112 is described further in relation to FIG. 2.

The storage 130 may be any form of storage solution comprising one or more storage controller 131.

Figure 2:
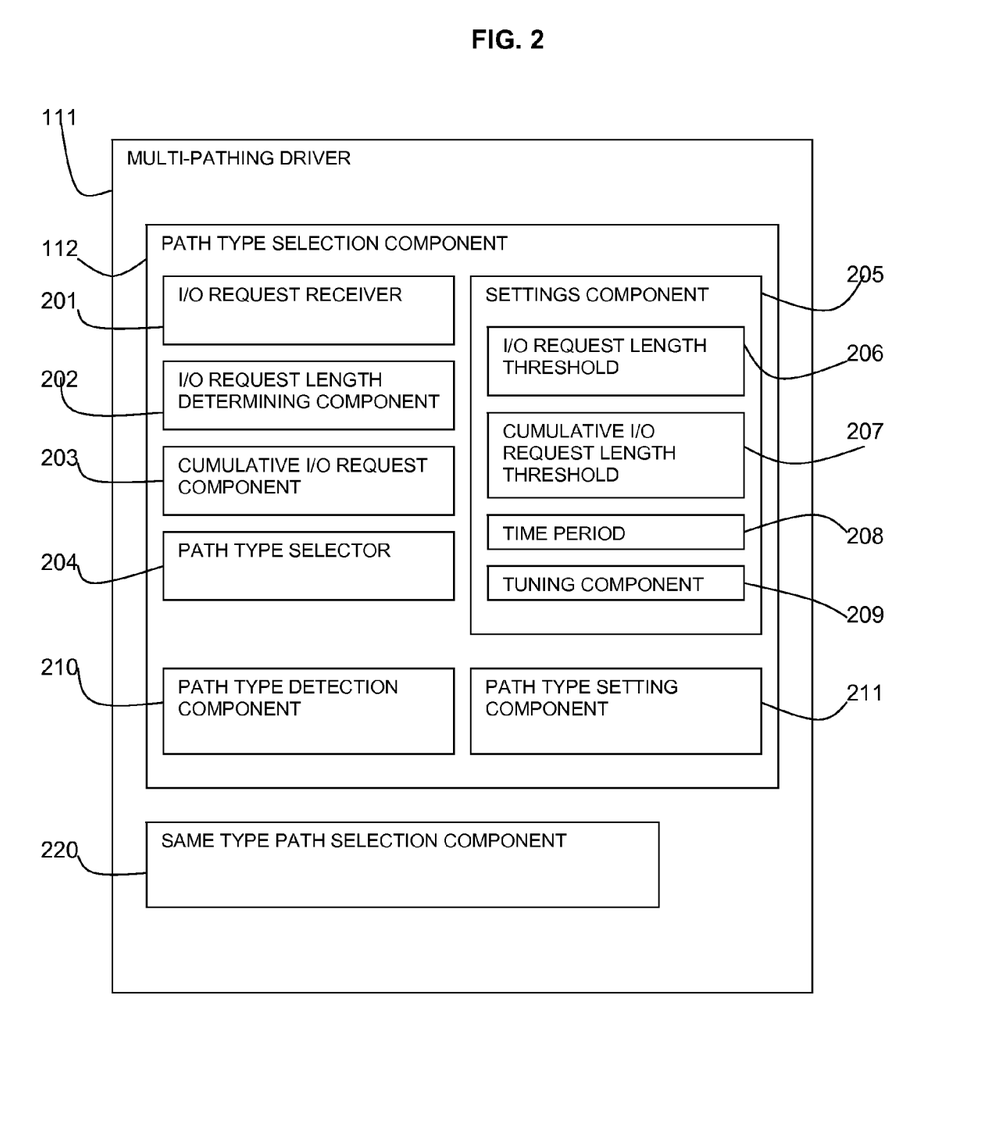
FIG. 2 is a block diagram of a multi-pathing driver in accordance with described embodiments.

Referring to FIG. 2, a multi-pathing driver 111 is provided including a path type selection component 112. The path type selection component 112 comprises an I/O request receiver 201, an I/O request length determining component 202, a cumulative I/O request component 203, and a path type selector 204. The path type selection component 112 determines which path type to use for an I/O request by evaluating the length of the I/O request and the cumulative total length of I/O requests sent to a path type in a given time.

The path type selection component 112 may comprise a settings component 205 for setting an I/O request length threshold 206, a cumulative I/O request length threshold 207, and a time period 208 for the cumulative length threshold. The settings component 205 may comprise a tuning component 209 for tuning the cumulative I/O request length threshold 207 and the time period 208 for a given SAN type.

The path type selection component 112 may also comprise a path type detection component 210 for detecting the type of path of a connected SAN. Alternatively, or additionally, a path type setting component 211 may be provided for configuring the types of connected SANs.

The multi-pathing driver 111 may also comprise a same type path selection component 220 for load-bearing requests over multiple SANs of the same type once a SAN type has been determined by the path type selection component 111 for an I/O request.

Figure 3:
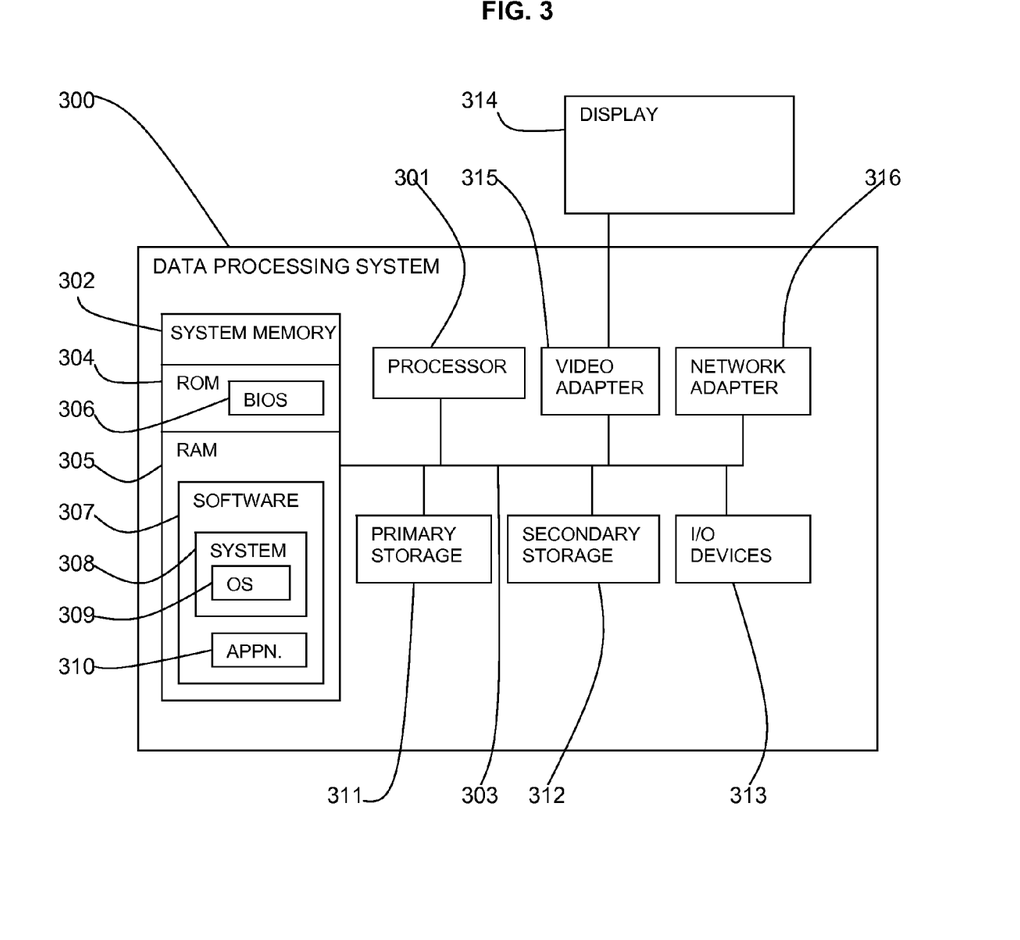
FIG. 3 is a block diagram of a computer system in which described embodiments may be implemented.

Referring to FIG. 3, an exemplary system for implementing aspects of the invention comprises a data processing system 300 suitable for storing and/or executing program code comprising at least one processor 301 coupled directly or indirectly to memory elements through a bus system 303. The memory elements can comprise local memory employed during actual execution of the program code, bulk storage, and cache memories which provide temporary storage of at least some program code in order to reduce the number of times code must be retrieved from bulk storage during execution.

The memory elements may comprise system memory 302 in the form of read only memory (ROM) 304 and random access memory (RAM) 305. A basic input/output system (BIOS) 306 may be stored in ROM 304. System software 307 may be stored in RAM 305 comprising operating system software 308. Software applications 310 may also be stored in RAM 305.

The system 300 may also comprise a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may comprise speakers, printers, etc. A display device 314 is also connected to system bus 303 via an interface, such as video adapter 315.

Figure 4:
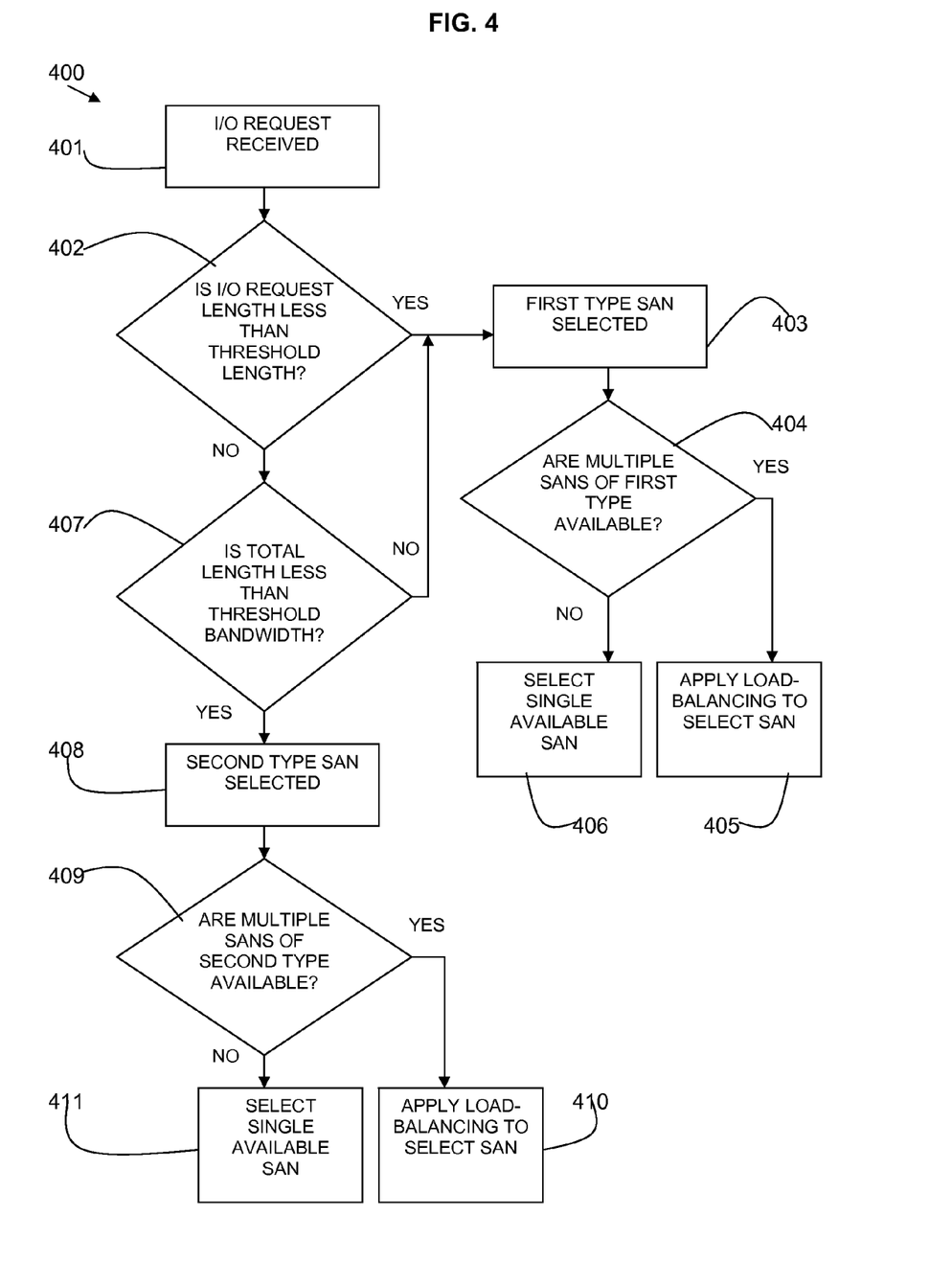
FIG. 4 is a flow diagram of a method in accordance with described embodiments.

Referring to FIG. 4, a flow diagram 400 shows an embodiment of a method of selecting a type of SAN where two types of SAN are available having different performance characteristics. In particular, a first type SAN has a higher IOPs compared to a second type SAN.

An I/O request is received at block 401. It is determined at block 402 if the I/O request length is less than a defined threshold length. If the I/O request length is less than a defined threshold length, then a first type SAN is selected 403 wherein the first type SAN has a higher IOPs compared to the second type SAN.

It is determined at block 404, if multiple SANs of the first type are available. If so, a load-balancing algorithm may be applied at block 405 to select the SAN to use. If (at block 404) there is only one SAN of the first type, that SAN is selected at block 406.

If (at block 402) the I/O request length is greater than the defined threshold, it is then determined at block 407 if the total length of I/O requests in the last given time period is less than a defined bandwidth threshold. If it is above the bandwidth threshold, the first type SAN is selected at block 403 and the load balancing may be applied (at block 405) if (at block 404) there are multiple SANs of the first type.

If (at block 407) the total length of I/O requests are below the bandwidth threshold, then the second type SAN is selected at block 408.

It is determined at block 409, if multiple SANs of the second type are available. If so, a load-balancing algorithm may be applied at block 410 to select the SAN to use. If (at block 409) there is only one SAN of the second type, that SAN is selected at block 411.

In one embodiment, the first type of SAN is a FC based SAN and the second type of SAN is an iSCSI based SAN. The iSCSI based SAN provides a lower cost option for increasing the bandwidth of a SAN while still providing good IOPs performance Furthermore, as most host servers have Ethernet network connections already it may be possible to add an iSCSI based SAN using existing infrastructure thus further reducing the cost of adding bandwidth to the SAN.

The described embodiments require the multi-pathing driver to implement a new path type selection algorithm for I/O requests. To retain the excellent IOPs performance provided by an FC SAN, it is necessary for the multi-pathing driver to submit all short length I/O requests via the FC SAN. To exploit the full bandwidth of the FC and iSCSI SAN, it is necessary for the multi-pathing driver to use both the FC and iSCSI paths for longer length I/O requests. As the shorter I/O requests are always submitted via the FC SAN, the multi-pathing driver should use an iSCSI path in preference to a FC path when submitting longer length I/O requests until the bandwidth of the iSCSI path has been consumed.

An example algorithm for selecting a path in such an embodiment might be:

1. If the length of an I/O request is less than 64 KB then select the FC path; Else,
2. Total length of I/O requests submitted to the iSCSI path in the last 100 milliseconds is less than 1 MB then select the iSCSI path; Else,
3. Select the FC path.

The length of time slice (100 ms) and the bandwidth 1 MB in step 2 above should be tuned to the available bandwidth of the iSCSI path. In this example, 1 MB every 100 ms gives a bandwidth of 100 MB/s that is approximately equal to the 1 Gb/s (100 MB/s=800 Mb/s because there are 8 bits to a byte on Ethernet networks, the remaining 200 Mb/s allows for the extra overheads of the iSCSI and Ethernet protocols) of bandwidth available on the iSCSI path.

If there are multiple FC paths or multiple iSCSI paths to the same storage LU then the multi-pathing driver can use existing techniques to load balance I/O requests across the same type of path. In this case, the above algorithm would be used to choose the type of path to use and then the standard path selection algorithms (as described in the background section) would be used to choose between paths of the same type.

The multi-pathing driver can either automatically detect the type of path to the storage based on information it can acquire from the low level transport driver (FC and iSCSI) or the user can configure the multi-pathing driver to select which paths should be used for short I/O requests and which paths should only be used for long I/O requests.

Typically, a large part of existing SAN infrastructure is FC based. FC SANs provide excellent performance for both shorter I/O requests (IOPs critical workloads) and longer I/O requests (bandwidth critical workloads) but are more expensive than deploying an iSCSI based SAN. An iSCSI based SAN provides excellent performance for longer I/O requests (bandwidth critical workloads) but has high CPU overheads for shorter I/O requests. Therefore, a path type selection algorithm as described makes use of the performance characteristics of each type of path.

The described method and system are also applicable in other scenarios where there are multiple paths between a host server and the storage controller that have different performance characteristics—for example, a user might have two FC SANs, one implemented using 4 Gb/s technology and the other implemented using 8 Gb/s technology.

A path type selection algorithm may be provided as a service to a customer over a network.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, comprising but not limited to optical or analogue communications lines, or intangibly using wireless techniques, comprising but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, comprising but not limited to, semiconductor, magnetic, or optical, or transmitted using any communications technology, present or future, comprising but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as an FPGA.

It will be clear to one skilled in the art that many improvements and modifications can be made to the foregoing exemplary embodiment without departing from the scope of the present invention.

What is claimed is:

1. A method for network multi-pathing, comprising:
    maintaining paths to a storage system through a first network type and a second network type, wherein the first network type has a higher Input/Output (I/O) per second performance characteristic than the second network type;
    receiving an I/O request;
    determining a length of the I/O request:
    sending the I/O request on one of the paths to the storage system through the first network type in response to determining that the length of the I/O request is below a threshold length; and
    sending the I/O request on one of the paths to the storage system through the second network type in response to determining that the length of the I/O request is above the threshold length.

2. The method of claim 1, further comprising:
    determining whether a bandwidth of the second network type is full for a time period in response to determining that the length of the I/O request is above the threshold length;
    sending the I/O request having the length above the threshold length on one of the paths to the storage system through the first network type in response to determining that the bandwidth of the second network type is full.

3. The method of claim 2, wherein determining whether the bandwidth of the second network type is full comprises:
    determining whether a total of lengths of I/O requests in a given time period is above a threshold bandwidth, wherein the bandwidth is full in response to determining that the total of the lengths is above the threshold.

4. The method of claim 3, further comprising:
    tuning the threshold bandwidth and the given time period to the available bandwidth of the second network type.

5. The method of claim 1, further comprising:
    detecting types of the first and second network types from a low level transport driver.

6. The method of claim 1, further comprising:
    receiving user configuration of the types of the first and second network types.

7. The method of claim 1, wherein the first network type is a Fibre Channel (FC) SAN, and the second network type is an Internet Small Computer System Interface (iSCSI) based SAN.

8. The method of claim 1, wherein the first network type is a Fibre Channel (FC) type SAN having a first bandwidth, and the second network type is a Fibre Channel (FC) type SAN having a second bandwidth which is lower than the first bandwidth.

* * * * *